(12) United States Patent
Nasrollahi et al.

(10) Patent No.: US 12,456,294 B2
(45) Date of Patent: Oct. 28, 2025

(54) VIDEO PROCESSING APPARATUS, METHOD AND COMPUTER PROGRAM USING IMAGE ENHANCEMENT

(71) Applicant: MILESTONE SYSTEMS A/S, Brøndby (DK)

(72) Inventors: Kamal Nasrollahi, Brøndby (DK); Zenjie Li, Brøndby (DK); Carlos Fernandez De Tejada Quemada, Brøndby (DK)

(73) Assignee: MILESTONE SYSTEMS A/S, Brøndby (DK)

( * ) Notice: Subject to any disclaimer, the term of this patent is extended or adjusted under 35 U.S.C. 154(b) by 412 days.

(21) Appl. No.: 17/839,283

(22) Filed: Jun. 13, 2022

(65) Prior Publication Data

US 2023/0008356 A1   Jan. 12, 2023

(30) Foreign Application Priority Data

Jul. 9, 2021   (GB) ...................................... 2109937

(51) Int. Cl.
*G06V 10/98*   (2022.01)
*G06F 16/783*   (2019.01)
(Continued)

(52) U.S. Cl.
CPC ........ *G06V 10/993* (2022.01); *G06F 16/7837* (2019.01); *G06V 10/25* (2022.01); *G06V 20/52* (2022.01)

(58) Field of Classification Search
USPC ....................................................... 382/190
See application file for complete search history.

(56) References Cited

U.S. PATENT DOCUMENTS

| 10,726,279 | B1* | 7/2020 | Kim | .................. G06N 3/045 |
| 2011/0040752 | A1* | 2/2011 | Svore | .................. G06F 16/951 |
| | | | | 707/E17.014 |

(Continued)

FOREIGN PATENT DOCUMENTS

| WO | 2014/186483 A1 | 11/2014 |
| WO | 2014/194481 A1 | 12/2014 |

OTHER PUBLICATIONS

Sandeep Dsouza, et al., Amadeus: Scalable, Privacy-Preserving Live Video Analytics, Cornell University Library, Nov. 6, 2020, arXiv:2011.05163v1, XP081810758.

*Primary Examiner* — Jacky X Zheng
(74) *Attorney, Agent, or Firm* — Canon U.S.A., Inc. IP Division

(57) ABSTRACT

A video processing apparatus configured to process a stream of video surveillance data, wherein the video surveillance data includes metadata associated with video data, the metadata describing at least one object in the video data. The apparatus comprises means for applying an image assessment algorithm to generate a reliability score for the metadata, and associating the reliability score with the metadata. The image assessment algorithm generates the reliability score based on an assessment of the image quality of the video data to which the metadata relates to indicate a likelihood that the metadata accurately describes the object. An image enhancement module applies image enhancement to video data if the reliability score of metadata associated with the video data indicates a low likelihood that the metadata accurately describes the object.

14 Claims, 3 Drawing Sheets

(51) Int. Cl.
G06V 10/25 (2022.01)
G06V 20/52 (2022.01)

(56) References Cited

U.S. PATENT DOCUMENTS

| | | |
|---|---|---|
| 2012/0106854 A1 | 5/2012 | Tang et al. |
| 2015/0264296 A1 | 9/2015 | Devaux |
| 2015/0304689 A1* | 10/2015 | Warren ............... H04L 12/2825 |
| | | 725/92 |
| 2016/0358628 A1 | 12/2016 | Liu et al. |
| 2018/0350106 A1 | 12/2018 | Kasilya Sudarsan et al. |

\* cited by examiner

VIDEO PROCESSING APPARATUS, METHOD AND COMPUTER PROGRAM USING IMAGE ENHANCEMENT

CROSS-REFERENCE TO RELATED APPLICATIONS

This application claims the benefit under 35 U.S.C. § 119(a)-(d) of UK Patent Application No. 2109937.9, filed on Jul. 9, 2021 and titled "A VIDEO PROCESSING APPARATUS, METHOD AND COMPUTER PROGRAM". The above cited patent application is incorporated herein by reference in its entirety.

TECHNICAL FIELD OF THE DISCLOSURE

The present disclosure relates to a video processing apparatus, method and computer program for processing a stream of video surveillance data which includes video data and metadata associated with the video data.

BACKGROUND OF THE DISCLOSURE

Many video analytics software modules are available which can analyse video surveillance data and detect specific objects or activity. These will typically attach metadata to the video stream indicating a time and position in the frame where the objects or activity have been detected, together with data describing the nature of the detected object or activity. Examples of types of object which can be detected are people, cars, license plates etc. Some object recognition algorithms are sophisticated enough to categorise people by age and gender, and metadata can indicate characteristics of detected objects such as colour or type of vehicle or age of a person or gender of a person. Once metadata has been included in video surveillance data, it can be used to conduct searches for particular objects or combinations of objects. For example, a search could be carried out for a black SUV, or a person of a particular age, gender and hair colour, or a vehicle with a particular license plate, or a combination of a bus and a blue car in the same frame.

Video analytics software which generate metadata can be run in various locations in a video surveillance system. Analytics software can be run on the camera, on an analytics server, a recording server or at a client device. In a cloud based system, video analytics may be run in the cloud.

Existing video analytics algorithms, like object detection algorithms, usually represent their output in form of metadata, including information like the position of the object, bounding box coordinates, class of the object, etc. Included in the metadata may be the confidence score, highlighting the level of confidence in the algorithm's output. This confidence score is highly biased by the training of the video analytics algorithm and available training samples. Therefore, demonstrating a high confidence score by a video analytics algorithm does not necessarily mean that their outputs are reliable.

Metadata which is generated by video analytics software can subsequently be used by a search engine to search for objects and/or events in the video data. The search engine may operate in a different location to the video analytics, for example the analytics may generate the metadata at the camera and the search engine may run on a server or a client device. Alternatively, the search engine and the video analytics may operate in the same location, for example on a video management server.

SUMMARY OF THE DISCLOSURE

The present disclosure provides the ability to generate a reliability score that is associated with the metadata which describes an object in the video data. The metadata has been generated by a video analytics module that recognises objects or behaviour of objects and associates the metadata with the portion of video data where the object is detected, wherein the metadata describes the object or behaviour that has been detected. The reliability score represents the likelihood that the metadata accurately describes the object. For example, if the metadata has been generated by an object recognition algorithm, it is the likelihood that the object has been correctly described, which provides an additional score (next to confidence score) to assess the usefulness of the detection. The present disclosure uses an assessment of image quality as a factor in generating the reliability score.

The present disclosure includes an image enhancement module which applies image enhancement to video data where the reliability score generated for the metadata associated with the video data indicates that the reliability of the metadata is low i.e. indicates a low likelihood that the metadata accurately describes the object. The reliability score may be generated in such a way that a higher score indicates a higher likelihood that the metadata accurately describes the object, and the image enhancement can be applied to video data where the reliability score for the metadata associated with the video data is below a threshold. However, the reliability score could be generated in an inverse manner i.e. a lower score indicates a higher likelihood that the metadata accurately describes the object, in which case the image enhancement would be applied to video data where the reliability score for the metadata associated with the video data is above a threshold.

The image assessment algorithm takes into account the image quality, but the generation of the reliability score may also take into account other factors, which may be specific to the analytics program that has generated the metadata. For example, some types of video analytics may be more adversely affected by particular conditions, for example lighting or motion blur or crowding. The video analytics program that generated the metadata can be identified from the metadata itself so that the image assessment algorithm can be tailored to take into account the factors that affect the reliability of the metadata generated by that particular program. For example, object tracking is sensitive to crowding, while detection is affected by motion blur and lighting.

It is also possible for the generation of the reliability score to take into account environmental factors e.g. weather conditions, time of day, etc., when generating the reliability score. For example, video data from an outdoor traffic monitoring camera may produce less reliable metadata (e.g. for license plate recognition or vehicle recognition) during hours of darkness or in rain, snow or fog. Data regarding these conditions can be obtained from external sensors, or from weather forecast data or sunrise/sunset times to contribute to calculating the reliability score.

Metadata for object recognition may include bounding box data defining an area of a frame in which an object has been detected. The image enhancement may only be applied to an area inside the bounding box. The image assessment algorithm may only assess the image quality in the area defined by the bounding box to generate the reliability score for the metadata related to the object in the bounding box. For example, in the case of facial recognition or license plate recognition, it may only be the quality of that part of the image that is important in assessing the reliability of the metadata.

The image assessment algorithm may be a non-reference based algorithm. A non-reference based algorithm does not require a reference image to compare to the current image to conclude if the current image is of good quality or not. A non-reference quality assessment uses pretrained models/knowledge to decide the quality of the current image without any specific reference image. Therefore, it is not camera or scene specific.

When the image enhancement has been applied to the video data corresponding to metadata with low reliability, the same analytics algorithm that generated the metadata can be re-run on the enhanced image data to regenerate the metadata. The reliability score may also be regenerated using the image assessment algorithm, and the new metadata, the new reliability score, and the enhanced image data may be added to the video surveillance data stream.

BRIEF DESCRIPTION OF THE DRAWINGS

Embodiments of the present disclosure will now be described, by way of example only, with reference to the accompanying drawings in which.

DETAILED DESCRIPTION OF THE PRESENT DISCLOSURE

One or more of functional blocks illustrated in FIG. 1 (described below) can be implemented by hardware, such as an application specific integrated circuit (ASIC) or a programmable logic allay (PLA), or can be implemented by a programmable processor, such as a central processing unit (CPU) or a micro-processing unit (MPU), executing software. Furthermore, one or more of the functional blocks illustrated in FIG. 1 can be implemented by a combination of software and hardware. Thus, in the following description, even in a case where different functional blocks are described as operating subjects, the functional blocks can be implemented by the same hardware.

An example of a hardware configuration includes a central processing unit (CPU), a read only memory (ROM), a random access memory (RAM). The CPU loads a control program stored in the ROM or a storage into the RAM, and performs various kinds of control.

Figure 1:
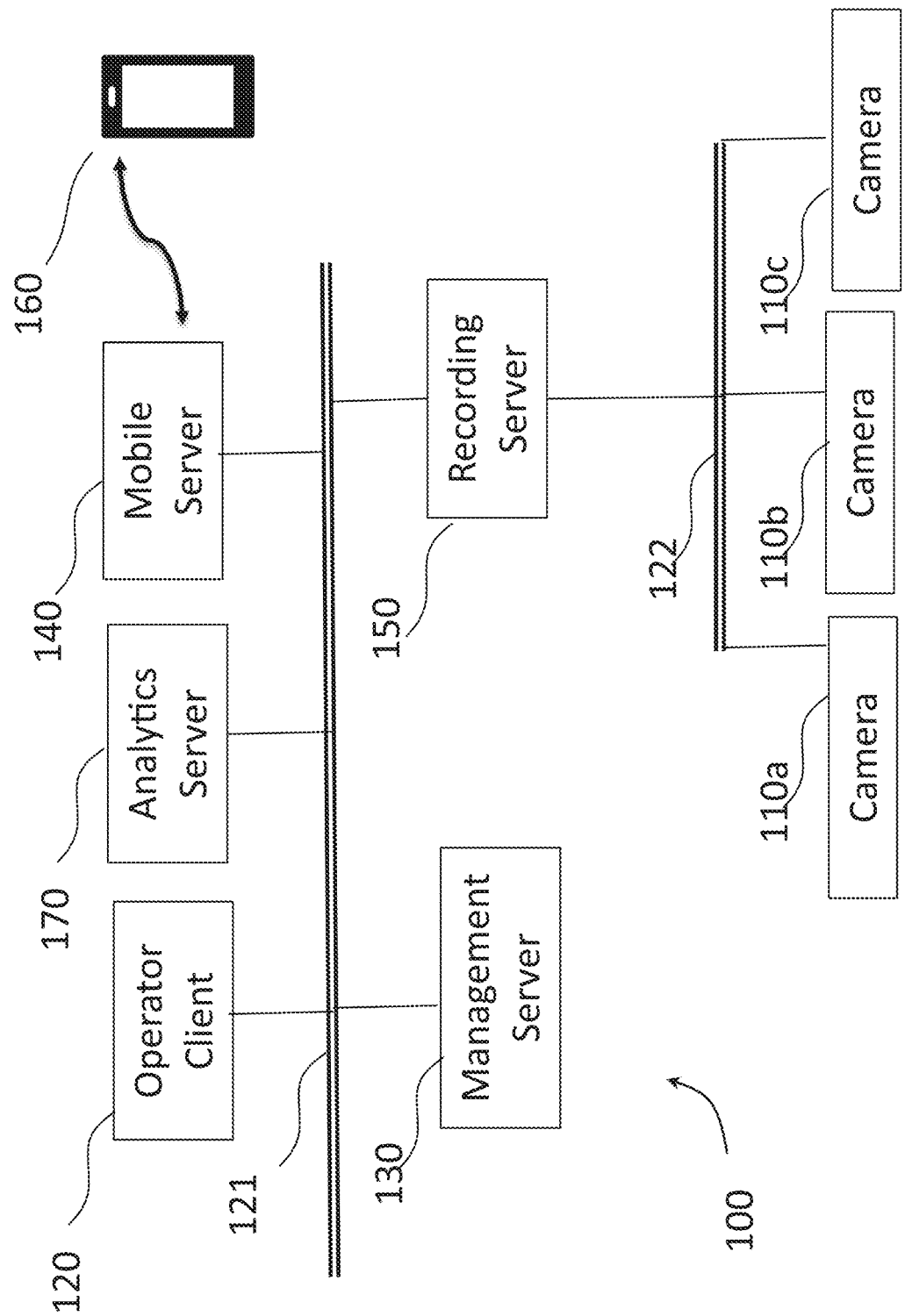
FIG. 1 shows a video surveillance system in which the present disclosure can be implemented.

FIG. 1 shows an example of a video surveillance system 100 in which embodiments of the present disclosure can be implemented. The system 100 comprises a management server 130, a recording server 150, an analytics server 170 and a mobile server 140, which collectively may be referred to as a video management system. Further servers may also be included in the video management system, such as further recording servers or archive servers. A plurality of video surveillance cameras 110a, 110b, 110c send video data to the recording server 150. An operator client 120 is a fixed terminal which provides an interface via which an operator can view video data live from the cameras 110a, 110b, 110c, or recorded video data from the recording server 150.

The cameras 110a, 110b, 110c capture image data and send this to the recording server 150 as a plurality of video data streams.

The recording server 150 stores the video data streams captured by the video cameras 110a, 110b, 110c. Video data is streamed from the recording server 150 to the operator client 120 depending on which live streams or recorded streams are selected by an operator to be viewed.

The mobile server 140 communicates with a user device 160 which is a mobile device such as a smartphone or tablet which has a touch screen display. The user device 160 can access the system from a browser using a web client or a mobile client. Via the user device 160 and the mobile server 140, a user can view recorded video data stored on the recording server 150. The user can also view a live feed via the user device 160.

The analytics server 170 can run analytics software for image analysis, for example motion or object detection, facial recognition, event detection. The analytics server 170 may generate metadata which is added to the video data and which describes objects which are identified in the video data.

Other servers may also be present in the system 100. For example, an archiving server (not illustrated) may be provided for archiving older data stored in the recording server 150 which does not need to be immediately accessible from the recording server 150, but which it is not desired to be deleted permanently. A fail-over recording server (not illustrated) may be provided in case a main recording server fails.

The operator client 120, the analytics server 170 and the mobile server 140 are configured to communicate via a first network/bus 121 with the management server 130 and the recording server 150. The recording server 150 communicates with the cameras 110a, 110b, 110c via a second network/bus 122.

The management server 130 includes management software for managing information regarding the configuration of the surveillance/monitoring system 100 such as conditions for alarms, details of attached peripheral devices (hardware), which data streams are recorded in which recording server, etc. The management server 130 also manages user information such as operator permissions. When an operator client 120 is connected to the system, or a user logs in, the management server 130 determines if the user is authorised to view video data. The management server 130 also initiates an initialisation or set-up procedure during which the management server 130 sends configuration data to the operator client 120. The configuration data defines the cameras in the system, and which recording server (if there are multiple recording servers) each camera is connected to. The operator client 120 then stores the configuration data in a cache. The configuration data comprises the information necessary for the operator client 120 to identify cameras and obtain data from cameras and/or recording servers.

Object detection/recognition can be applied to the video data by object recognition software running on the analytics server 170. The object recognition software generates metadata which is associated with the video stream and defines where in a frame an object has been detected, which may be in the form of coordinates defining a bounding box. The metadata may also define what type of object has been detected e.g. person, car, dog, bicycle, and/or characteristics of the object (e.g. colour, speed of movement etc.). Other types of video analytics software can also generate metadata, such as license plate recognition, or facial recognition. The metadata generated by these analytics algorithms usually also includes a confidence score, demonstrating their confidence on what they have produced.

Object detection/recognition software, may be run on the analytics server 170, but some cameras can also carry out object detection/recognition and generate metadata, which is included in the stream of video surveillance data sent to the recording server 150. Therefore, metadata from video analytics can be generated in the camera, in the analytics server 170 or both. It is not essential to the present disclosure where the metadata is generated. The metadata may be stored in the recording server 150 with the video data, and transferred to the operator client 120 with or without its associated video data.

The video surveillance system of FIG. 1 is an example of a system in which the present invention can be implemented. However, other architectures are possible. For example, the system of FIG. 1 is an "on premises" system, but the present disclosure can also be implemented in a cloud based system. In a cloud based system, the cameras stream data to the cloud, and at least the recording server 150 is in the cloud. Video analytics may be carried out at the camera, and/or in the cloud. The operator client 120 or mobile client 160 requests the video data to be viewed by the user from the cloud.

A search facility of the operator client 120 allows a user to look for a specific object or combination of objects by searching metadata. Metadata generated by video analytics such as object detection/recognition discussed above can allow a user to search for specific objects or combinations of objects (e.g. white van or man wearing a red baseball cap, or a red car and a bus in the same frame, or a particular license plate or face). The operator client 120 or the mobile client 160 will receive user input of at least one search criterion, and generate a search query.

A search is then carried out for metadata matching the search query. The search software then sends a request to extract image data from the recording server 150 corresponding to portions of the video data having metadata matching the search query, based on the timestamp of the video data. This extracted image data is then received by the operator client 120 or mobile client 160 and presented to the user at the operator client 120 or mobile client 160 as search results, typically in the form of a plurality of thumbnail images, wherein the user can click on each thumbnail image to view a video clip that includes the object or activity.

However, if the imaging condition is poor, for example, light changes, objects move too fast, images are noisy, etc., cameras will fail to produce high-quality images. Consequently, generated metadata, for such poor quality images will not be reliable, regardless of the confidence score generated by video analytics algorithms.

Therefore, in the present disclosure, an image assessment algorithm is used to generate a reliability score for the metadata based on an assessment of the image quality of the video data to which the metadata relates. For example, if the metadata identifies an object in a frame, the image assessment algorithm assesses the image quality of that frame and generates a reliability score indicating a likelihood that the metadata accurately describes the object. The reliability score is then associated with the metadata in the video surveillance data stream. The image assessment algorithm is preferably a non-reference based quality assessment algorithm.

The image assessment algorithm may determine, from the metadata, a video analytics program used to generate the metadata and assess the image quality based on criteria selected dependent on the particular video analytics program used to generate the metadata. The accuracy of different analytics programs may be affected by different image quality criteria (e.g. colour, sharpness etc.), which is not necessarily reflected in the confidence score of the video analytics algorithm, but this can be factored into the image assessment algorithm and will be reflected in the reliability score. The image assessment algorithm may also take into account environmental factors that could affect the accuracy of the video analytics, such as time of day or weather conditions.

The image assessment algorithm may be applied to a whole frame, or a part of a frame. In particular, if the metadata includes coordinates defining a bounding box in which an object has been detected, the image assessment algorithm may assess the image quality of the part of the image inside the bounding box to generate the reliability score for the metadata relating to that bounding box. There may be more than one bounding box in a single frame, and different reliability scores will be generated for the metadata associated with each bounding box. For example, it may be that within an image, parts of the image are in shade and any metadata relating to objects in that part of the image may have a lower reliability score than metadata relating to objects in well-lit parts of the same image.

The reliability score can be used simply to rank the results of a metadata search, and to display the results in order of the reliability score. For example, if results are provided in a list, the list can be arranged so that a user is presented with search results in which the metadata has a higher reliability score at the top of the list. This will increase the speed at which a user can find a particular object or combination of objects because they are presented with the most reliable results first. Other ways in which the search results could be displayed to distinguish those with higher reliability scores could be by the use of colour highlighting, or any other visual indication.

The reliability scores can also be used to selectively apply image enhancement to frames or parts of frames where the reliability of the metadata is determined to be low e.g. the reliability score is below a pre-defined threshold. The image enhancement can be applied to a whole frame, or if a bounding box is present, to the area inside a bounding box. If multiple bounding boxes are present in one frame, then this may mean the image enhancement is applied to only some of the areas defined by the bounding boxes in one frame. In the example given above, where parts of the image are in shade, it may be that bounding boxes within the shaded part of the image require enhancement but other bounding boxes do not.

After the image enhancement, the video analytics that generated the original metadata can be re-run on the enhanced images and new metadata generated. The enhanced image(s) and the enhanced metadata will be added to the stream along with the original images and metadata, and stored on the recording server 150. The new metadata and images can be used later, for new search criteria and/or in-depth visual inspection.

An embodiment of the present disclosure will now be described with reference to FIGS. 2 and 3.

Figure 2A:
FIGS. 2A, 2B and 2C illustrate an embodiment of the present disclosure.
Figure 3:
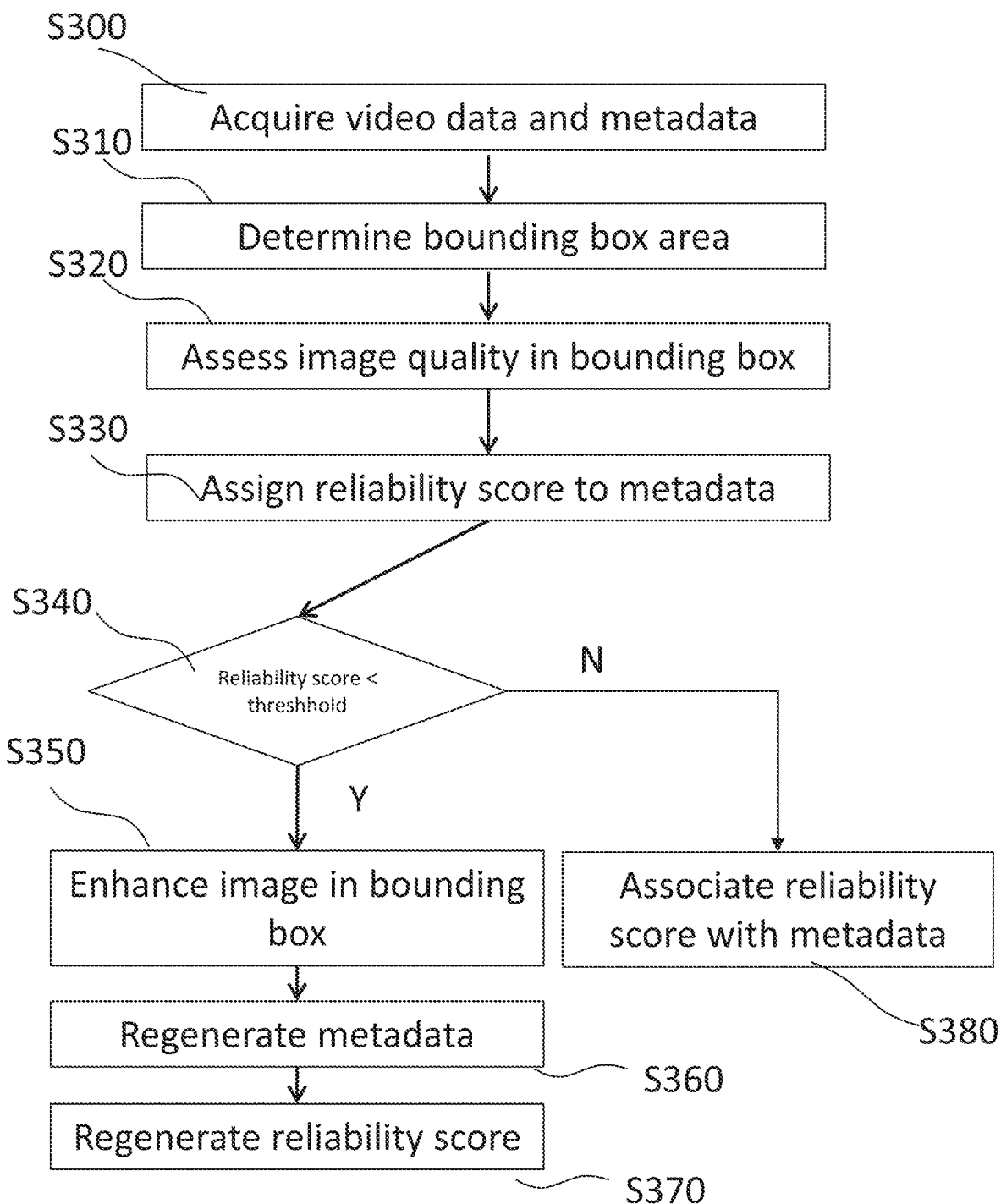
FIG. 3 is a flow chart of a method according to an embodiment of the present disclosure.

In this embodiment, the video analytics that generates the metadata is a face recognition algorithm, and the metadata includes bounding box data defining an area 1 of a frame in which a face has been identified, as shown in FIG. 2A. FIG. 3 is a flow chart of the method of this embodiment.

In step S300, the video surveillance data is acquired, wherein the video surveillance data includes the video data and the metadata which has been generated by the video analytics.

In step S310, bounding box data is determined from the metadata, wherein the bounding box data indicates regions in video frames where objects have been detected.

In step S320, an image assessment algorithm assesses the image quality in each region defined by each set of bounding box data corresponding to a detected object, in this embodiment, a face.

In step S330, a reliability score is assigned to the metadata describing the object based on the image quality as assessed by the image assessment algorithm. The reliability score represents a measure of the reliability of the metadata relating to the object in the bounding box.

In step S340, it is determined whether the reliability score is less than a threshold i.e. the reliability of the metadata is lower than a threshold. If the reliability score is below the threshold, in step S350, image enhancement is applied to the region within the bounding box. The type of image enhancement may be chosen in view of the type of analytics that has generated the metadata, like a face super-resolution or a light enhancement algorithm.

Figure 2B:
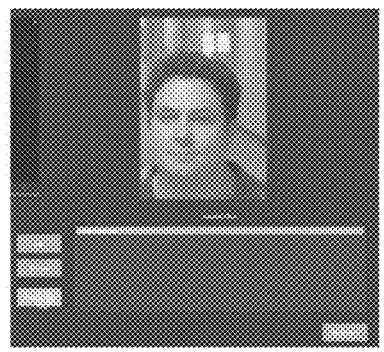
Figure 2C:
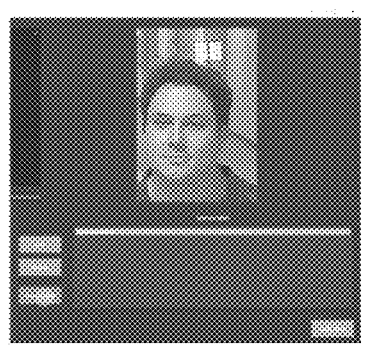

FIGS. 2B and 2C illustrate the bounding box region before and after the image enhancement respectively.

In S360, the metadata is regenerated based on the image enhanced region, using the same analytics program that was used to generate the initial metadata.

In Step S370, the reliability score may be regenerated by application of the image assessment algorithm. This step is not necessary but can be useful if the reliability scores are used later, for example to rank search results. The enhanced image, the new metadata and the new reliability score (if generated) are added to the data stream.

If, in step S340, it is determined that the reliability score is greater than the threshold, then in step S380, the reliability score is added to the stream and associated with the metadata.

There are multiple different ways the method of the present disclosure can be applied in the system of FIG. 1, depending on where in the system the video analytics is carried out and the metadata generated.

For example, many modern video surveillance cameras include analytics modules that generate metadata that is transferred to the recording server 150 with the video data. In this case, it would be possible to carry out some or all of the method at the camera. For example, the image quality algorithm could be applied at the camera and the reliability scores generated and added to the metadata in the camera, and included in the video surveillance data that is streamed to the video management system. Then, any steps of image enhancement and regeneration of metadata may be carried out in the video management system, for example in the analytics server 170 and the resulting video surveillance data including the metadata, video data and reliability scores could be stored in the recording server 150.

If analytics are carried out and metadata generated in the video management system, for example in the analytics server 170, then the method could be entirely carried out at the analytics server 170. The analytics server 170 would carry out analytics, generate metadata and apply the image quality algorithm to generate the reliability scores. The analytics server 170 could then carry out any steps of image enhancement and regeneration of metadata, and the resulting video surveillance data including the metadata, video data and reliability scores could be stored in the recording server 150.

In the above described embodiments, the metadata which is associated with the video data can be searched using a search facility of the operator client 120 (or the mobile client 160) and the results displayed to the user on a display of the operator client 120 (or mobile client 160). The reliability scores may be used to rank search results and display the results such that search results with higher reliability scores are emphasised in the display format e.g. the results could be displayed in order of the reliability scores, with those with highest reliability scores listed first.

While the present disclosure has been described with reference to embodiments, it is to be understood that the present disclosure is not limited to the disclosed embodiments. The present disclosure can be implemented in various forms without departing from the principal features of the present disclosure as defined by the claims.

The invention claimed is:

1. A video processing apparatus configured to process a stream of video surveillance data, wherein the video surveillance data includes metadata associated with video data, the metadata describing at least one object in the video data, comprising:
   at least one memory storing instructions; and
   at least one processor executing the instructions causing the video processing apparatus to:
   apply an image assessment algorithm to generate a reliability score for the metadata, and associating the reliability score with the metadata, wherein the image assessment algorithm generates the reliability score based on an assessment of the image quality of the video data to which the metadata relates, to indicate a likelihood that the metadata accurately describes the object; and
   apply image enhancement to video data if the reliability score of metadata associated with the video data indicates a low likelihood that the metadata accurately describes the object,
   wherein the image assessment algorithm is a non-reference based algorithm.

2. The video processing apparatus according to claim 1, wherein the metadata includes bounding box data defining an area of a frame in which the object has been detected, and the image enhancement is applied only in the area defined by the bounding box.

3. The video processing apparatus according to claim 1, wherein the at least one processor executing the instructions causing the video processing apparatus to further apply object recognition to the enhanced video data to generate new metadata based on the enhanced video data, and associate the new metadata with the video data.

4. The video processing apparatus according to claim 3, wherein the object recognition applied after the image enhancement is the same as the object recognition that generated the metadata for which the reliability score was generated.

5. The video processing apparatus according claim 1, wherein the image assessment algorithm determines a video analytics program used to generate the metadata and assesses the image quality based on criteria selected based on the video analytics program used to generate the metadata.

6. The video processing apparatus according to claim 1, wherein the image assessment algorithm is configured to assess the image quality based on information relating to the environment.

7. The video processing apparatus according to claim 1, wherein the metadata includes bounding box data defining an area of a frame in which the object has been detected, and the image assessment algorithm assesses the image quality only in the area defined by the bounding box to generate the reliability score for the metadata related to the object in the bounding box.

8. The video processing apparatus according to claim 1, wherein the at least one processor executing the instructions causing the video processing apparatus to further perform object recognition on the video data and generate the metadata describing objects recognized.

9. A method of processing a stream of video surveillance data, wherein the video surveillance data includes metadata associated with video data, the metadata describing at least one object in the video data, comprising:
   applying an image assessment algorithm to generate a reliability score for the metadata;
   associating the reliability score with the metadata, wherein the image assessment algorithm generates the reliability score based on an assessment of the image quality of the video data to which the metadata relates, to indicate a likelihood that the metadata accurately describes the object; and
   applying image enhancement to video data if the reliability score of metadata associated with the video data indicates a low likelihood that the metadata accurately describes the object,
   wherein the image assessment algorithm is a non-reference based algorithm.

10. The method according to claim 9, wherein the metadata includes bounding box data defining an area of a frame in which the object has been detected, and the image assessment algorithm assesses the image quality only in the area defined by the bounding box to generate the reliability score for the metadata related to the object in the bounding box.

11. The method according to claim 9, wherein the metadata includes bounding box data defining an area of a frame in which the object has been detected, and the image enhancement is applied only in the area defined by the bounding box.

12. A computer implemented method of searching video surveillance data based on metadata associated with the video surveillance data, wherein the metadata describes objects in the video data, and includes a reliability score for the metadata corresponding to each object which represents a likelihood that the metadata accurately describes the object, comprising:
   carrying out a search for metadata having a reliability score that indicates a low likelihood that the metadata accurately describes the object; and
   applying image enhancement to the video data corresponding to the metadata having the reliability score indicating a low likelihood that the metadata accurately describes the object,
   wherein the image assessment algorithm is a non-reference based algorithm.

13. The method according to claim 12, wherein the metadata includes bounding box data defining an area of a frame in which an object has been detected, and the image enhancement is applied only in the area defined by the bounding box.

14. A non-transitory computer-readable program which, when run on a computer, causes the computer to carry out the method according to claim 9.

* * * * *